United States Patent [19]

Krivak et al.

[11] Patent Number: 4,832,865
[45] Date of Patent: May 23, 1989

[54] COMPOSITION CONTAINING NON-IONIC SURFACTANT

[75] Inventors: Sandra L. Krivak, Akron; William A. Williams, Jr., North Canton; Louis J. Nehmsmann, Akron; Edward J. Sare, Clinton, all of Ohio

[73] Assignee: PPG Industries, Inc., Pittsburgh, Pa.

[21] Appl. No.: 140,852

[22] Filed: Jan. 5, 1988

[51] Int. Cl.$^4$ .............................................. C11D 7/50
[52] U.S. Cl. ................... 252/174.21; 252/127; 252/165; 252/171; 252/174.22; 252/DIG. 1; 252/DIG. 8
[58] Field of Search .................... 252/DIG. 8, 174.21, 252/DIG. 1, 174.22, 165, 171, 127

[56] References Cited

U.S. PATENT DOCUMENTS

| | | | |
|---|---|---|---|
| 1,970,578 | 8/1934 | Schoeller et al. | 260/98 |
| 2,097,441 | 11/1937 | Bruson | 260/150 |
| 2,098,203 | 11/1937 | Bruson | 260/150 |
| 2,209,911 | 7/1940 | Bruson et al. | 260/613 |
| 2,213,477 | 9/1940 | Steindorff et al. | 260/613 |
| 2,249,111 | 7/1941 | Bruson | 260/613 |
| 2,593,112 | 4/1952 | Cross | 260/613 |
| 2,676,975 | 4/1954 | Fortess et al. | 260/46 |
| 2,817,686 | 12/1957 | Lo Cicero et al. | 260/613 |
| 2,901,383 | 8/1959 | Lebsanft et al. | 134/7 |
| 3,061,552 | 10/1962 | Schenck | 252/135 |
| 3,294,847 | 12/1966 | Albright et al. | 260/615 |
| 3,351,560 | 11/1967 | Brown et al. | 252/171 |
| 3,426,077 | 2/1969 | Eiseman et al. | 260/615 |
| 3,437,697 | 4/1969 | Hodgkiss | 260/615 |
| 3,630,919 | 12/1971 | Sheaffer et al. | 252/88 |
| 3,748,268 | 7/1973 | Loudas | 252/90 |
| 3,865,756 | 2/1975 | Smith | 252/529 |
| 3,956,162 | 5/1976 | Lautenberger | 252/162 |
| 4,199,482 | 4/1980 | Renaud | 252/559 |
| 4,304,691 | 12/1981 | Farmer et al. | 252/545 |
| 4,606,840 | 8/1986 | Gautier | 252/171 |

OTHER PUBLICATIONS

Bennett, H., *The Chemical Formulary*, N.Y., Chemical Publishing Co., Inc., 1967, pp. 190–197.
*Chemical Abstracts*, Description of Registry Nos. 70025-62-6 and 27274-28-8.
*Chemical Abstracts*, 72, 133547s.
Kirk-Othmer, *Encyclopedia of Chemical Technology*, 3d Edition, vol. 16, John Wiley & Sons, New York, 1981, pp. 762–768.
M. R. Adamchuk et al., UFEX-12 Conference and Exposition, Feb., 1987, pp. 25–28.

*Primary Examiner*—A. Lionel Clingman
*Attorney, Agent, or Firm*—George D. Morris

[57] ABSTRACT

A composition comprises: (A) chlorine-containing organic solvent selected from the group consisting of methylchloroform, trichloroethylene, perchlorethylene, and mixtures thereof, and (B) non-ionic surfactant selected from the group consisting of

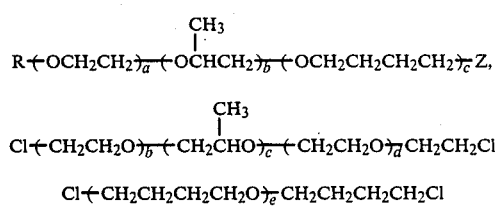

$$Cl(CH_2CH_2CH_2CH_2O)_e CH_2CH_2CH_2CH_2Cl$$

or mixtures thereof, wherein: (C) each R is independently straight or branched alkyl containing from about 8 to about 24 carbon atoms or

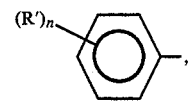

(D) each R' is independently straight or branched alkyl containing from about 8 to about 18 carbon atoms, (E) each Z is independently fluoro, chloro, bromo, or alkoxy containing from 1 to about 4 carbon atoms, (F) the average value of a is in the range of from 0 to about 100, (G) the average value of b is in the range of from 0 to about 60, (H) the average value of c is in the range of from 0 to about 50, (I) the sum of the average values of a, b, and c is in the range of from 3 to about 150, (J) the sum of the average values of d and f is in the range of from 2 to about 50, (K) the average value of e is in the range of from 2 to about 60, (L) the average value of g is in the range of from 2 to about 50, (M) the average value of n is in the range of from 0 to about 2, and (N) the composition is essentially free of methylene chloride.

16 Claims, No Drawings

COMPOSITION CONTAINING NON-IONIC SURFACTANT

BACKGROUND OF THE INVENTION

Paint-removing compositions, also known as paint strippers and paint stripping compositions, are used to remove dried films of paint, varnish, or shellac from various substrates including but not limited to wood, metal, concrete, cement, brick, glass, and many organic polymers Typically the paint removing composition is applied to the dried film and allowed to remain for a period of time while the composition attacks the film. After the film has been loosened, the composition and the loose film is removed from the substrate by light scraping (as with a putty knife), wiping and/or washing.

Most of the widely used and accepted paint removing compositions contain methylene chloride (viz., dichloromethane) because of the ability of this compound to efficiently solvate or dissolve a wide variety of paint, varnish, and shellac binders or saponification residues of such binders. Paint removing compositions in general, and methylene chloride based paint removing compositions in particular, are discussed in "Paint and Varnish Removers", *Kirk-Othmer Encyclopedia of Chemical Technology*, 3d Ed, John Wiley & Sons, New York, 1981, pages 762–768.

The ongoing toxicological testing of methylene chloride by various investigators, however, has produced an accumulation of results raising questions of safety in using methylene chloride for many purposes including its use as a component of paint removing compositions. This has prompted a search for a compound or mixture of compounds which may be substituted for methylene chloride in paint removing compositions and yet function at least about as effectively as methylene chloride with respect to most paint, varnish, and shellac films. Some compounds are known which are very effective, but because they have toxicological problems of their own, or because of their high cost, they are not commercially acceptable.

THE INVENTION

Compositions essentially free of methylene chloride have been discovered which in most cases are about as effective as, and in some cases more effective than, methylene chloride-containing paint removing compositions in removing most paint, varnish, and shellac films. Briefly, it has been found that methylene chloride can be replaced by the combination of at least one of a particular class of chlorine-containing organic solvents and at least one of a particular class of non-ionic surfactants. Accordingly, the invention is a composition comprising: (A) chlorine-containing organic solvent selected from the group consisting of methylchloroform, trichloroethylene, perchloroethylene, and mixtures thereof, and (B) non-ionic surfactant selected from the group consisting of

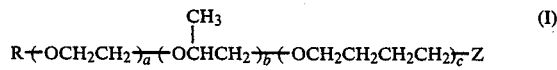
(I)

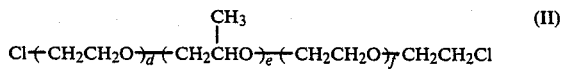
(II)

-continued
Cl†CH₂CH₂CH₂CH₂O)g̅CH₂CH₂CH₂Cl (III)

or mixtures thereof, wherein: (C) each R is independently straight or branched alkyl containing from about 8 to about 24 carbon atoms or

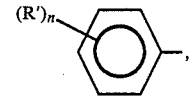

(D) each R' is independently straight or branched alkyl containing about 8 to about 18 carbon atoms, (E) each Z is independently fluoro, chloro, bromo, or alkoxy containing from 1 to about 4 carbon atoms, (F) the average value of a is in the range of from 0 to about 100, (G) the average value of b is in the range of from 0 to about 60, (H) the average value of c is in the range of from about 0 to about 50, (I) the sum of the average values of a, b, and c is in the range of from 3 to about 150, (J) the sum of the average values of d and f is in the range of from 2 to about 50, (K) the average value of e is in the range of from 2 to about 60, (L) the average value of g is in the range of from 2 to about 50, (M) the average value of n is in the range of from 0 to about 2, and (N) the composition is essentially free of methylene chloride.

Although trivial or trace amounts of methylene chloride may be present, it is preferred that the composition contain no methylene chloride.

Of the three chlorine-containing organic solvents, methylchloroform (viz., 1,1,1-trichloroethane) is preferred.

The non-ionic surfactant of Formulae (I), (II), and (III) is free of hydroxy groups. Although some hydroxy-functional non-ionic surfactant may also be present in the composition, it should not be present in such large amount that the function of the non-ionic surfactant of Formulae (I), (II), and (III) is significantly adversely impaired. When hydroxy-functional non-ionic surfactant is present, the amount is usually a trivial or trace amount such as that provided by the hydroxy-functional non-ionic surfactant impurities ordinarily associated with the non-ionic surfactant of Formulae (I), (II) and (III) employed in producing the composition. Preferably, the composition is essentially free of hydroxy-functional non-ionic surfactant.

In Formula (I), R is straight or branched alkyl containing from about 8 to about 24 carbon atoms or

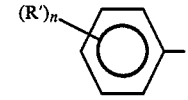

Usually R contains from about 8 to about 18 carbon atoms. Preferably, R contains from about 12 to about 16 carbon atoms. Each R' is independently straight or branched alkyl containing from about 8 to about 18 carbon atoms. In many cases $R^1$ contains from about 8 to about 12 carbon atoms. From about 8 to about 9 carbon atoms are preferred. The average value of n is in the range of from 0 to about 2. Preferably, the average value of n is about 1. The average value of a is in the range of from 0 to about 100. Often the average value of a is in the range of from about 3 to about 60. From about 5 to about 30 is preferred. The average value of b is in the range of from 0 to about 60. Frequently the average value of b is in the range of from about 0 to about 40. From about 0 to about 25 is preferred. The average value of c is in the range of from 0 to about 50. In many cases the average value of c is in the range of from about 0 to about 35. From about 0 to about 20 is preferred. The above ranges for the average values of a, b, and c taken individually are subject to the proviso that the sum of the average values of a, b, and c is in the range of from 3 to about 150. Often the sum is in the range of from about 3 to about 50. From about 3 to about 25 is preferred.

Formula I is diagrammatic, and it is not intended to imply that the three parenthetical portions are necessarily blocks or in the order shown, although blocks in any order may be used when desired. In many cases when groups of more than one kind are used, they are more or less random especially when more than a few groups are employed and when mixtures of alkylene oxides are used in the ether-forming reaction. In other cases, especially when differing alkylene oxides are reacted sequentially to form polyethers, the groups may be arranged in blocks. Preferred block arrangements are where groups derived from ethylene oxide are adjacent R and/or Z, especially Z.

In Formula (II), the sum of the average values of d and f is in the range of from 2 to about 50. Often the sum is in the range of from about 2 to about 30. From about 4 to about 10 is preferred. In most cases, the average values of d and f are each at least 1. Preferably, the average values of d and (f+1) are at least approximately equal. The average value of e is in the range of from 10 to about 60. Frequently, the average value of e is in the range of from about 20 to about 40. From about 25 to about 35 is preferred.

Formula (II) is not diagrammatic and the three parenthetical portions are blocks.

In Formula (III), the average value of g is in the range of from 2 to about 50. Often the average value of g is in the range of from about 5 to about 30. From about 10 to about 20 is preferred.

Although the value of a will be an integer for any particular compound within Formula (I), the average value of a for mixtures of compounds within Formula (I) may be an integer or a non-integer consistent with the ranges of a indicated above. The same principles apply to the values of b, c, d, e, f, g, and n for individual compounds and mixtures of compounds within Formulae (I), (II), and (III).

The non-ionic surfactants used in the invention and their methods of preparation are known. See for example, U.S. Pat. Nos. 2,097,441; 2,098,203; 2,209,911; 2,249,111; 2,817,686; 3,061,552; 3,294,847; 3,426,077; and 3,437,697, the disclosures of which are, in their entireties, incorporated herein by reference.

See also the Chemical Abstracts descriptions for Registry Nos. 70025-62-6 and 27274-28-8, the entire disclosures of which are also incorporated herein by reference.

Examples of suitable non-ionic surfactants include:
Surfactant (A): A mixture of compounds represented by $$R''-OCH_2CH_2)_3Cl$$

where for individual compounds R'' is essentially linear alkyl containing from 12 to 15 carbon atoms.
Surfactant (B): A mixture of compounds represented by

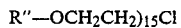
$$R''-OCH_2CH_2)_{15}Cl$$

where R'' has the same meaning as for Surfactant (A).
Surfactant (C): $C_{10}H_{21}-OCH_2CH_2)_{10}Cl$
Surfactant (E): A mixture represented by Formula (II) where the average value of e is about 31, the sum of the average values of d and f is about 4.5, and the average values of d and (f+1) are approximately equal.
Surfactant (F): A mixture represented by Formula (III) where the average value of g is about 12.5.
Surfactant (G):

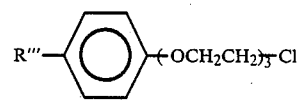

where R''' is 1,1,3,3-tetramethylbutyl.

The amount of the chlorine-containing organic solvent and the surfactant present in the composition may vary widely.

In most cases, the chlorine-containing organic solvent constitutes at least about 30 percent by weight of the composition. Often it constitutes at least about 60 percent by weight of the composition. At least about 70 percent by weight is preferred. Frequently, the chlorine-containing organic solvent constitutes from about 30 to about 95 percent by weight of the composition. In many cases it constitutes from about 60 to about 85 percent by weight of the composition. From about 70 to about 80 percent by weight is preferred.

Usually the non-ionic surfactant constitutes at least about 1 percent by weight of the composition. In many cases, it constitutes at least about 2 percent by weight of the composition. At least about 3 percent by weight is preferred. Frequently, the non-ionic surfactant constitutes from about 1 to about 10 percent by weight of the composition. In many cases, it constitutes from about 2 to about 7 percent by weight of the composition. From about 3 to about 5 percent by weight is preferred.

The composition usually, but not necessarily, also contains one or more optional materials which may be included for a wide variety of purposes.

One such optional material is soap. The soaps are the lithium, sodium, potassium, or amine salts of aliphatic long chain monocarboxylic acids (saturated or unsaturated) which may be derived from natural fats or oils and which contain from about 8 to about 22 carbon atoms, more usually from about 8 to about 18 carbon atoms. The preferred amine salts are the ethanolamine salts, including the monoethanolamine salts, the diethanolamine salts, and the triethanolamine salts. Preferably, the soap is oleic soap such as the lithium, sodium, potassium, or amine salt of oleic acid. The sodium, potassium, and ethanolamine salts of oleic acid are especially preferred. These oleic soaps ordinarily function as gelling agents which help retard the composition from flowing when used on an inclined surface. Amino-functional soaps such as the ethanolamine salts of oleic acid serve as scavengers for hydrogen chloride. The soap may be added during formulation of the composition, or the acid and base may be added and the soap formed in situ. The amount of the soap present in the composition can vary widely, but when it is used, it ordinarily constitutes from about 0.1 to about 10 percent by weight of the composition. From about 2 to about 6 percent by weight is preferred. When used, only one soap or a mixture of different soaps may be employed as desired.

Another material which may optionally be present is ethyl cellulose of viscosity grade 100 or lower. The viscosity grade is the viscosity expressed in centipoises of a solution consisting of 5 percent by weight of the ethyl cellulose in 80/20 w/w toluene/ethanol, measured at 25° C. using a Ubbelohde viscometer. Frequently, the ethyl cellulose is of viscosity grade 50 or lower. Preferably, it is of viscosity grade 10 or lower. Ethyl cellulose ordinarily functions as a gelling agent to retard the flow of the composition. The amount of ethyl cellulose present in the composition can vary widely. When it is used, it often constitutes from about 0.1 to about 10 percent by weight of the composition. From about 0.5 to about 5 percent by weight is preferred.

Yet another material which may optionally be present is paraffin wax, microcrystalline wax, or a mixture thereof. Paraffin wax is preferred. These essentially hydrocarbon waxes have some gelling properties, but they are mainly used for their crusting effect. Upon application of the composition to a painted, varnished, or shellacked surface, organic solvent begins to evaporate. If the composition contains paraffin wax, microcrystalline wax, or a mixture thereof, early solvent evaporation will leave a crust of the wax on the surface of the composition exposed to the atmosphere. The wax crust serves to retard further the solvent evaporation so that the remaining solvent will be available to attack the paint, varnish, or shellac film during the time the composition is allowed to remain in contact with the film. The amount of such wax present in the composition can vary widely, but when it is used, it ordinarily constitutes from about 0.1 to about 20 percent by weight of the composition. From about 2 to about 6 percent by weight is preferred.

Various additives may optionally be included in the composition for various purposes. Many secondary solvents such as methyl ethyl ketone and toluene are helpful in solvating some types of binders such as alkyd resins. Other additives such as methanol and N-methyl-2-pyrrolidone are helpful in solvating many latex paint binders. Amines, such as the ethanolamines, are frequently used as hydrogen chloride scavengers.

The amount of such optional additives may also vary widely. When used, such additives taken collectively often constitute from about 0.1 to about 50 percent by weight of the composition. From about 15 to about 30 percent by weight is preferred.

The listing of optional materials discussed above is by no means exhaustive. Other materials may be employed in their customary amounts for their customary purposes so long as they do not seriously interfere with the function of the composition.

The composition may contain water, but if water is present, the water content is low. In most cases, the water content of the composition is less than 5 percent by weight. Frequently, the water content is less than 1 percent by weight. Preferably, it is less than 0.25 percent by weight. It is especially preferred that the composition be essentially anhydrous.

The compositions of the invention are usually prepared by admixing the various ingredients. Mixing may be accompanied by heating when it is desirable to hasten dissolution of solid materials.

In using the composition to remove one or more layers of paint, varnish, or shellac, the composition is applied to the surface layer and allowed to stand without external disturbance for a period of time as will enable the composition to loosen one or more films from the substrate.

The application may be made by any conventional means including, but not limited to coating, brushing, pouring, spreading, spraying, dabbing, dipping, and the like. The thickness of the applied composition is usually in the range of from about 0.1 to about 5 millimeters, although greater or lesser thicknesses may be employed as desired. In many cases, the thickness of the applied layer is in the range of from about 0.1 to about 2 millimeters.

The period of time that the applied composition is allowed to stand on the surface layer without external disturbance is highly variable and is dependent upon many factors. One of the advantages of the compositions of the invention is that many of them may be used to loosen a wide variety of paint, varnish, and shellac films. Nevertheless, the numbers of paint, varnish, and shellac binders are extraordinarily large and some are more susceptible to attack than others. One factor, then, is the nature of the paint, varnish, or shellac film being removed. Another factor is the degree to which it is desired to remove the film. Shorter standing times may be used, for example, when it is acceptable to leave some of the film on the substrate. Other factors include the porosity of the substrate, the degree of bonding between substrate and film, temperature, humidity, and the like. In most cases, however, the applied composition is allowed to stand on the film without external disturbance for from about 3 to about 120 minutes. Often it is allowed to stand from about 10 to about 45 minutes. From about 15 to about 25 minutes is preferred in most circumstances.

After the composition has been allowed to stand in contact with paint, varnish or shellac film for a time sufficient to loosen the film or as much of it as is desired, the composition and the loose film is removed. In most cases, this can be accomplished by wiping, washing with water or organic solvent, or spraying with water or organic solvent. In some cases, light scraping (as with a putty knife) or brushing is used to assist in removing the composition and/or loosened film.

One treatment with the composition is ordinarily sufficient to loosen and remove most paint, varnish, and shellac films. Occasionally, however, as where the number of superimposed films is excessive or a film is resistive to attack, a sequence of two or more treatments may be used.

After drying, the substrate may, if desired, be further treated as desired, as for example, by sanding, sand blasting and/or painting.

Although the compositions of the invention have been principally described in conjunction with their use as paint removing compositions, their utility is not so limited and they have many other uses. They may, for example, be used for the rejuvenation of many catalysts, for cleaning papermaking felts, as spot removers, as dry cleaning compositions, and the like.

The invention is further described in conjunction with the following examples which are to be considered illustrative rather than limiting, and in which all parts are parts by weight and all percentages are percentages by weight unless otherwise specified.

Several brands of commercially available paint removing compositions, some containing methylene chloride and some not, were purchased and evaluated for their effectiveness in removing a wide variety of paint, varnish, and shellac films. Of the brands tested, one was identified as being the most generally effective in removing a wide variety of films. This brand, which was a gel and contained methylene chloride, petroleum distillate, and less than 4 percent methanol, was adopted as the standard against which newly developed compositions were compared and is referred to in the Examples as the Control.

In the Examples, the following abbreviations have the following meanings.
TCE=1,1,1-Trichloroethane
Tri=Trichloroethylene
Per=Perchloroethylene
MeCl$_2$=Methylene chloride
MEA Oleate=Monoethanolamine salt of oleic acid
EC=Ethyl cellulose of viscosity grade 10
MEK=Methyl ethyl ketone
NMP=N-Methyl-2-pyrrolidone
MEA=Monoethanolamine

EXAMPLES I-V (Comparative)

Wooden boards were painted with two coats of commercially available paint. After the second coat had dried, circles having diameters of 5.08 centimeters were marked of on each board. Except as otherwise noted, about ½ milliliter of a test composition was applied over a circular area, allowed to stand, and evaluated for its paint removing ability after wiping with a paper towel and then after scraping with a putty knife. The test compositions were TCE and the Control, respectively. The conditions and results are shown in Table 1.

TABLE 1

| EXAMPLE | CONDITIONS AND RESULTS |
| --- | --- |
| I | Paint Type: Latex.<br>Second Coat Drying Time: ½ hour.<br>TCE: Much bubbling. Not much paint was removed by wiping. The paint was well softened and was scrapable.<br>Control: No bubbling. Good removal of paint by wiping. The paint was scrapable. |
| II | Paint Type: Latex.<br>Second Coat Drying Time: 2½ days.<br>TCE: Little bubbling. The paint was sticky and little was removed by wiping. Some paint was scraped off.<br>Control: Stand time was 10 minutes. Some bubbling. Good removal of paint by wiping and by scraping. |
| III | Paint Type: Latex.<br>Second Coat Drying Time: 2½ days.<br>TCE: Some bubbling. After standing 2 minutes, almost all TCE had evaporated. The paint was sticky. Only a very small amount of paint was removed by wiping and only a small amount was removed by scraping.<br>Control: Stand time was 10 minutes. Good paint softening. Good removal of paint by wiping and by scraping, but needs another application. |
| IV | Paint Type: Enamelized Alkyd.<br>Second Coat Drying Time: 3½ days.<br>TCE: Standing time was 2 minutes because of rapid evaporation. No bubbling. Little or none of the paint was removed by wiping. A very small amount of paint was removed by scraping.<br>Control: The amount used was a thick layer applied by brush. Standing time was 3 minutes. Good bubbling. Good cracking and discoloration of paint. Wiping was not performed. Good removal of paint by scraping. |
| V | Paint Type: Enamelized Alkyd.<br>Second Coat Drying Time: 32 days.<br>TCE: The test composition was allowed to stand until the visually observed liquid had evaporated. No bubbling. No paint was removed by wiping. Little or none of the paint was removed by scraping. A second application of ½ milliliter of TCE was made to the same area. No bubbling. Little paint was removed by wiping. Little paint was removed by scraping. Not much difference was obtained by using the second application.<br>Control: Bubbling and cracking of the paint almost immediately after application. Standing time was 15 minutes. Good removal of the upper paint layer by wiping. Good removal of the lower paint layer by scraping. |

Examples I-V show that 1,1,1-trichloroethane itself is not very effective as a paint removing composition.

EXAMPLE VI

Two coats of commercially available latex paint were drawn down on wooden boards using a Bird applicator. The first coat was allowed to dry 2 days before application of the second coat. The second coat was allowed to dry one day before applying paint removing compositions.

A first paint removing composition was prepared by admixing 79 parts of TCE, 15 parts of paraffin wax, 4 parts of methanol, and 2 parts of Surfactant (A).

A second paint removing composition was prepared by admixing 79 parts of TCE, 15 parts of paraffin wax, 4 parts of methanol, and 2 parts of Surfactant (B).

Each of the above paint removing compositions and the Control were applied to circles drawn on a latex-coated board described above. The three paint removing compositions were allowed to stand without external disturbance for 15 minutes. The paint removing compositions were then wiped off together with any accompanying paint. The remaining paint was scraped using a putty knife. The results are shown in Table 2.

TABLE 2

| COMPOSITION | BUBBLING | WIPE | SCRAPE | OTHER REMARKS |
| --- | --- | --- | --- | --- |
| First | None, but softened paint. | No paint removed. | Good paint removal; came off in one piece. | Good Results. Almost as good as the Control. Left wood a little lumpy. |
| Second | None, but softened paint. | No paint removed. | Good paint removal; came off in one piece. | Left paint on wood. |
| Control | Good. Good cracking and lifting of paint. | Almost all paint removed. | Almost all remaining paint removed with little effort. | Much smoother wood surface than the above removers. |

EXAMPLE VII

Two coats of commercially available enamelized alkyd paint were drawn down on wood boards using a Bird applicator. The first coat was allowed to dry 2 days before application of the second coat. The second coat was allowed to dry 2 days before applying paint removing compositions.

Each of the first and second paint removing compositions of Example VI and the Control were applied to circles drawn on an alkyd-coated board described above. The three paint removing compositions were allowed to stand without external disturbance for 15 minutes and then the paint removing compositions were wiped off together with any accompanying paint. The remaining paint was scraped using a putty knife. The results are shown in Table 3.

TABLE 3

| COMPOSITION | BUBBLING | WIPE | SCRAPE | OTHER REMARKS |
| --- | --- | --- | --- | --- |
| First | Good. | A moderate amount of removed. | More paint removed. | Some paint left in grain of wood. |
| Second | Good. | Good removal of paint. | Unnecessary. | Almost all paint removed. |
| Control | Best. | Good removal of paint. | Unnecessary. | Substantially all paint removed. |

EXAMPLE VIII

An aqueous potassium hydroxide solution was formed by dissolving 5.6 parts of potassium hydroxide in 30 parts of water. The solution was then heated and while maintaining the temperature in the range of from about 48° C. to about 60° C., 28.2 parts of oleic acid was added very slowly with agitation. The reaction mixture gelled and was allowed to cool to room temperature. The resulting product was a potassium oleate soap gel.

A composition was formed by admixing 64 parts of TCE, 6 parts of MEK, 6 parts of NMP, 5 parts of paraffin wax, 5 parts of the above soap gel, 4 parts of Surfactant (B), 4 parts of methanol, 3 parts of EA, and 3 parts of toluene. The composition was heated and stirred slowly until mixed thoroughly add then allowed to cool to room temperature to produce a paint removing composition.

Painted boards were obtained for use in testing paint removing compositions. The boards were of Douglas Fir which had been primed with alkyd primer and then topcoated with a glossy alkyd paint. The painted boards were at least 2 years old.

The above paint removing composition was applied to one of the above painted boards and allowed to stand without external disturbance for approximately 15 minutes. The paint removing composition was then wiped off together with any accompanying paint. The remaining paint was scraped using a putty knife. Bubbling occurred during the standing period as did softening and some lifting of the paint. Much of the topcoat and primer was removed by wiping. Most of the remainder was removed by scraping with almost no effort.

One day later, the above paint removing composition was applied to one of the above painted boards and allowed to stand without external disturbance for about 20 minutes. The treated area was then wiped and scraped as in the preceding paragraph. Bubbling occurred during the standing period as did softening of the paint. Much of the topcoat and primer was removed by wiping. Essentially all of the remainder was removed by scraping with almost no effort.

The above paint removing composition was next used to remove paint from a board where a latex topcoat had been applied over an alkyd base coat. Bubbling was observed during the standing period. The latex paint wiped off completely and the alkyd paint was completely removed by scraping using a putty knife.

The above paint removing composition was also used to remove paint from a board where an alkyd topcoat had been applied over an alkyd base coat. A little bubbling was observed during the standing period as was softening of the paint. The paint was scraped almost completely off using a putty knife.

EXAMPLE IX

A paint removing composition was prepared by admixing 67 parts of TCE, 6 parts of MEK, 6 parts of NMP, 5 parts of paraffin wax, 5 parts of the potassium oleate soap gel of Example VIII, 4 parts of Surfactant(B), 4 parts of methanol, and parts of MEA.

A comparative composition was prepared by admixing 71 parts of TCE, 6 parts of MEK, 6 parts of NMP, 5 parts of paraffin wax, 5 parts of the potassium oleate soap gel of Example VIII, 4 parts of methanol, and 3 parts of MEA.

Both compositions were tested for their paint removing ability on wooden boards which had been coated with the following paint systems respectively: alkyd, latex over alkyd, and alkyd over alkyd. The standing times were about 15 minutes. Wiping and then scraping were the performed in accordance with the general procedures of the preceding Examples. Good paint removal was obtained from all three boards using the above paint removing composition. One layer paint removal was obtained from the three boards using the above comparative composition. It was observed that the comparative composition did not penetrate the paint very deeply.

This Example demonstrates that non-ionic surfactant is necessary in the formulation for the achievement of effective paint removal.

EXAMPLE X

A wooden dresser drawer which had been painted with white interior alkyd paint was obtained. The painted drawer was at least 8 years old.

The paint removing composition of Example IX and the Control were applied to separate areas of the painted drawer and allowed to stand about 15 minutes. Both compositions caused bubbling and paint softening. Almost all paint treated with the paint removing composition of Example IX was removed upon wiping, whereas more paint treated with the Control was left on the wood.

EXAMPLE XI

A paint removing composition was prepared by admixing 67 parts of Tri, 6 parts of MEK, 6 parts of NMP, 5 parts of paraffin wax, 5 parts of the potassium oleate soap gel of Example VIII, 4 parts of Surfactant (B), 4 parts of methanol, and 3 parts of MEA.

The above paint removing composition was applied to several substrates which had been painted with various paints. Standing time was about 15 minutes. Excellent paint removal from all substrates was obtained by scraping with a putty knife.

EXAMPLE XII

A paint removing composition was prepared by admixing 67 parts of TCE, 6 parts of NMP, 6 parts of MEK, 5 parts of paraffin wax, 5 parts of the potassium oleate soap of Example VIII, 4 parts of methanol, 4 parts of Surfactant (C) and 3 parts of MEA.

The above paint removing composition was applied to a painted substrate. Standing time was about 20 minutes. Very good paint removal was obtained.

EXAMPLE XIII

A paint removing composition was prepared by admixing 67 parts of TCE, 6 parts of MEK, 6 parts of NMP, 5 parts of paraffin wax, 5 parts of the potassium oleate soap gel of Example VIII, 4 parts of methanol, 4 parts of Surfactant (E), and 3 parts of MEA.

The above paint removing composition was applied to a painted substrate. Standing time was about 20 minutes. Very good paint removal was obtained.

EXAMPLE XIV

A paint removing composition was prepared by admixing 67 parts of TCE, 6 parts of MEK, 6 parts of NMP, 5 parts of the potassium oleate soap gel of Example VIII, 5 parts of paraffin wax, 4 parts of methanol, 4 parts of Surfactant (F), and 3 parts of MEA.

The above paint removing composition was applied to a painted substrate. Standing time was about 20 minutes. Very good paint removal was obtained.

EXAMPLE XV

A paint removing composition was prepared by admixing 74 parts of TCE, 6 parts of NMP, 5 parts of paraffin wax, 4 parts of MEA, 3 parts of oleic acid, 4 parts of Surfactant (B), and 4 parts of methanol.

EXAMPLE XVI

A paint removing composition was prepared by admixing 74.25 parts of TCE, 6 parts of NMP, 5 parts of paraffin wax, 4 parts of MEA, 3 parts of oleic acid, 4 parts of Surfactant (B), and 3.75 parts of methanol.

EXAMPLE XVII

A paint removing composition was prepared by admixing 74.25 parts of TCE, 6 parts of NMP 5 parts of paraffin wax, 4 parts of MEA, 4 parts of Surfactant (G), 3.75 parts of methanol, and 3 parts of oleic acid.

The above paint removing composition was applied to a painted substrate. Standing time was about 20 minutes. All layers of paint on the substrate were softened and easy to remove by scraping with a putty knife. Good paint removal was obtained.

EXAMPLE XVIII

A paint removing composition was prepared by admixing 74 parts per, 6 parts of NMP, 5 parts of paraffin wax, 4 parts of MEA, 3 parts of oleic acid, 4 parts of Surfactant (B), and 4 parts of methanol.

The above paint removing composition was applied to a painted substrate. Standing time was about 20 minutes. Good paint removal was obtained by scraping with a putty knife.

EXAMPLE XIX

A paint removing composition was prepared by admixing 4 parts of Surfactant (B), 4 parts of methanol, 6 parts of NMP, 12 parts of EC, and 74 parts of TCE.

The above paint removing composition was applied to a board which had been painted with latex paint. Standing time was 15 minutes. Wiping removed a little paint. Scraping using a putty knife removed most of the remaining paint.

The above paint removing composition was applied to a board which had been painted with alkyd enamel. Standing time was 15 minutes. Wiping and scraping removed most of the paint.

Although the present invention has been described with reference to specific details of certain embodiments thereof, it is not intended that such details should be regarded as limitations upon the scope of the invention except insofar as they are included in the accompanying claims.

We claim:

1. A composition useful for removing dried films of paint, varnish or shellac from substrates, said composition comprising:
   (A) chlorine-containing organic solvent selected from the group consisting of methylchloroform, trichloroethylene, perchloroethylene, and mixtures thereof, and
   (B) non-ionic surfactant selected from the group consisting of

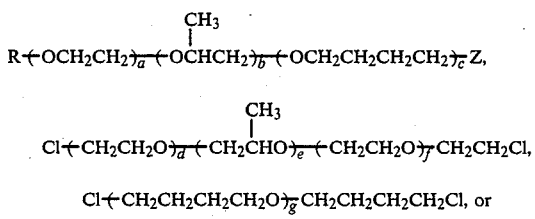

$$Cl+CH_2CH_2CH_2CH_2O)_{\overline{g}}CH_2CH_2CH_2CH_2Cl, \text{ or}$$

or mixtures thereof,
wherein:

(C) each R is independently straight or branched alkyl containing from about 8 to about 24 carbon atoms, or

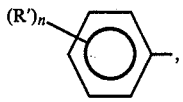

(D) each R' is independently straight or branched alkyl containing from about 8 to about 18 carbon atoms,
(E) each Z is independently fluro, chloro, bromo, or alkoxy containing from 1 to about 4 carbon atoms,
(F) the average value of a is in the range of from 0 to about 100,
(G) the average value b is in the range of from 0 to about 60,
(H) the average value of c is in the range of from 0 to about 50,
(I) the sum of the average values of a, b, and c is in the range of from about 3 to about 150,
(J) the sum of the average values of d and f is in the range of from 2 to about 50,
(K) the average value of e is in the range of from 2 to about 60,
(L) the average value of g is in the range of from about 2 to about 50,
(M) the average value of n is in the range of from 0 to about 2,
(N) the composition is essentially free of methylene chloride,
(O) the water content of the composition is less than 1 percent by weight, and
(P) the parenthetical portions subscripted by a, b and c are not necessarily blocks or in the order shown.

2. The composition of claim 1 wherein said solvent constitutes at least about 30 percent by weight of said composition and wherein said surfactant constitutes at least about 1 percent by weight of said composition.

3. The composition of claim 1 wherein said solvent constitutes from about 30 to about 95 percent by weight of said composition and wherein said surfactant constitutes from about 1 to about 10 percent by weight of said composition.

4. The composition of claim 1 which further comprises oleic soap.

5. The composition of claim 4 wherein said oleic soap is the sodium salt of oleic acid, the potassium salt of oleic acid or the monoethanolamine salt of oleic aid.

6. The composition of claim 4 wherein said oleic soap constitutes from about 0.1 to about 10 percent by weight of said composition.

7. The composition of claim 1 which further comprises ethyl cellulose of viscosity grade 100 or lower.

8. The composition of claim 7 wherein said ethyl cellulose constitutes from about 0.1 to about 10 weight percent of said composition.

9. The composition of claim 1 which further comprises paraffin wax, microcrystalline wax, or a mixture thereof.

10. The composition of claim 9 wherein said paraffin wax, microcrystalline wax, or mixture thereof constitutes from about 0.1 to about 20 weight percent of said composition.

11. The composition of claim 1 which further comprises additive selected from the group consisting of methyl ethyl ketone, toluene, 1-methyl-2-pyrrolidinone, methanol, ethanolamine, or a mixture thereof.

12. The composition of claim 11 wherein said additive constitutes from about 0.1 to about 50 percent by weight of said composition.

13. The composition of claim 1 wherein the water content is less than 0.25 percent by weight.

14. The composition of claim 1 wherein said solvent is methylchloroform.

15. The composition of claim 2 wherein said solvent is methylchloroform.

16. The composition of claim 3 wherein said solvent is methylchloroform.

* * * * *

UNITED STATES PATENT AND TRADEMARK OFFICE
CERTIFICATE OF CORRECTION

PATENT NO. : 4,832,865

DATED : May 23, 1989

INVENTOR(S) : Sandra L. Krivak, William A. Williams, Jr., Louis J. Nehmsmann, Edward J. Sare It is certified that error appears in the above-identified patent and that said Letters Patent is hereby corrected as shown below:

In Claim 1, column 13, line 3, after the last line of the formula, the first instance of $\underline{or}$ should be deleted - $Cl-(CH_2CH_2CH_2CH_2O)_g CH_2CH_2 CH_2CH_2Cl$, [or]

In Claim 11, column 14, line 37, the word ethanolamine should be deleted - methanol, [ethanolamine], or a mixture thereof.

Signed and Sealed this

Tenth Day of July, 1990

Attest:

HARRY F. MANBECK, JR.

*Attesting Officer*

*Commissioner of Patents and Trademarks*